(12) United States Patent  
Mazac

(10) Patent No.: US 8,632,119 B2
(45) Date of Patent: Jan. 21, 2014

(54) FOLD OUT CAMPING TRAILER

(71) Applicant: Timothy Mazac, Parma, ID (US)

(72) Inventor: Timothy Mazac, Parma, ID (US)

(*) Notice: Subject to any disclaimer, the term of this patent is extended or adjusted under 35 U.S.C. 154(b) by 0 days.

(21) Appl. No.: 13/629,029

(22) Filed: Sep. 27, 2012

(65) Prior Publication Data

US 2013/0076062 A1 Mar. 28, 2013

Related U.S. Application Data

(60) Provisional application No. 61/539,647, filed on Sep. 27, 2011.

(51) Int. Cl.
B60P 3/355 (2006.01)

(52) U.S. Cl.
USPC ............. 296/173; 296/26.01; 296/26.08

(58) Field of Classification Search
USPC ......... 296/171, 173, 174, 175, 176, 26.01, 296/26.02, 26.08, 26.09, 26.1, 181.71, 296/184.1, 203.01, 204, 205, 26.05; 52/66, 52/67
See application file for complete search history.

(56) References Cited

U.S. PATENT DOCUMENTS

| 2,457,581 | A | * | 12/1948 | McCain | 296/171 |
| 3,168,343 | A | * | 2/1965 | Marcel | 296/156 |
| 3,445,134 | A | * | 5/1969 | Beck, Jr. et al. | 296/173 |
| 3,583,755 | A | * | 6/1971 | Hedrick, Jr. | 296/170 |
| 3,830,541 | A | * | 8/1974 | Bowman et al. | 296/171 |
| 4,114,942 | A | * | 9/1978 | Greiner | 296/172 |
| 4,397,476 | A | * | 8/1983 | Bolyard et al. | 280/656 |
| 4,511,155 | A | * | 4/1985 | Galloway | 280/204 |
| 4,863,212 | A | * | 9/1989 | Jansen | 296/173 |
| 5,544,944 | A | * | 8/1996 | Keech | 298/5 |
| 5,596,944 | A | * | 1/1997 | Massie | 116/28 R |
| 6,042,175 | A | * | 3/2000 | Williams | 296/185.1 |
| 7,246,844 | B2 | * | 7/2007 | Guidry | 296/173 |
| 7,488,030 | B2 | * | 2/2009 | Nadeau | 296/172 |
| 7,854,460 | B2 | * | 12/2010 | Tweet et al. | 296/65.03 |
| 8,353,534 | B2 | * | 1/2013 | Arnold et al. | 280/801.1 |
| 2002/0195798 | A1 | * | 12/2002 | James | 280/656 |
| 2011/0169290 | A1 | * | 7/2011 | Sheikhha et al. | 296/26.09 |

FOREIGN PATENT DOCUMENTS

EP    350228 A2 * 1/1990  ............... B60P 3/34

* cited by examiner

Primary Examiner — Glenn Dayoan
Assistant Examiner — Pinel Romain
(74) Attorney, Agent, or Firm — Robert L. Shaver; Dykas & Shaver

(57) ABSTRACT

Disclosed is a fold out camping trailer which is generally in a tear drop shape, and which expands from a towing or storage configuration into a sleeping or camping configuration. The camping trailer is split into two sections, and the two sections pull apart to extend and provide sleeping space. The frame to which the two sections are attached has a telescoping portion which allows the two body sections to expand.

9 Claims, 4 Drawing Sheets

FOLD OUT CAMPING TRAILER

PRIORITY/CROSS-REFERENCE TO RELATED APPLICATIONS

This application claims the benefit of U.S. Provisional Application No. 61/539,647, filed Sep. 27, 2011, the disclosure of which is incorporated by reference.

TECHNICAL FIELD

The disclosure generally relates to the field of camping trailers and more particularly to camping trailers which expand from a traveling position into a camping position by use of a telescoping frame.

BACKGROUND

There are many types of camping trailers available, including some that expand and extend. There are very few campers, however, which are small enough to be towed behind a motorcycle and yet which can provide the user with a comfortable bed. There are no campers which expand by use of a telescoping frame. In a version that is for towing by a motorcycle, such a trailer style would allow a design which is light enough and compact enough to be towed behind a motorcycle. Other modes of trailers would be larger, for towing by ATVs, 4 wheelers, automobiles, or trucks. The motorcycle towable version would be not much wider than a user's shoulders, and long enough when in use for a tall user, but compact enough when being towed that it would not change the driving characteristics of the motorcycle.

SUMMARY OF THE DISCLOSURE

Disclosed is a fold out camping trailer. The trailer has a trailer frame with a telescoping section that allows a rear section to extend out from the forward section, with a bed which is usable by the use when the camping trailer is extended. The camping trailer includes a generally tear drop shaped trailer body with a forward section and a rear section, with the rear section attached to one end of a telescoping portion of the frame, and the forward section attached to the other telescoping section. The division between the forward and rear camper halves is approximately in the middle of the tear drop camper body, in a vertical plane. The telescoping sections of the camper frame would typically be one (1) square tubing inside another square tubing, which could extend out by pulling the rear section of the trailer body. Versions of the disclosed trailer can also have multiple extending frame members, such as two or three.

The forward and rear camper halves of the trailer body are connected through the telescoping members of the frame and also by a folding trailer floor which is attached to the bottom edges of the two trailer body sections. The folding trailer floor is made up of floor panels which are hinged to each other and hinged to the trailer body floor edges. When the forward and rear section of the trailer body are pushed together, the floor pieces hinge up in an accordion-like fashion. When the rear section of the trailer body is pulled out and extended on the telescoping unit, the floor pieces are pulled flat, and rest on top of the telescoping frame sections.

The bottom side of the floor pieces can have a floor support piece which hinges down and provides additional stability and support for the floor pieces, which make up the floor under the bed.

Between the forward and rear section is a tent body made of a flexible fabric. This folds together when the forward and rear body sections are pulled apart, and is stretched tight when the rear section is pulled out from the forward section. The tent body provides a weather proof covering for a bed which is formed on the folding trailer 4, and which is bounded by the forward and rear trailer body sections.

The trailer includes a left and right wheel which is attached to the rear section of the trailer body and to the trailer frame. The device includes one or more closure devices such as latches or locks which lock the forward body section to the rear body section in the closed position.

The rear body section can also have a rear hatch cover which hinges open and exposes a rear storage compartment in which cooking or other supplies may be stored.

The two-wheel trailer of this invention is configured to be very small and light, and is likely to be sized for compact sleeping of one or two people side by side. It is designed to be pulled by a two (2) wheel vehicle, such as a motorcycle or bicycle, or a small vehicle such as a four wheeler, ATV, or compact car or small SUV.

The purpose of the Abstract is to enable the public, and especially the scientists, engineers and practitioners in the art who are not familiar with patent or legal terms or phraseology, to determine quickly from a cursory inspection, the nature and essence of the technical disclosure of the application. The Abstract is neither intended to define the inventive concept(s) of the application, which is measured by the claims, nor is it intended to be limiting as to the scope of the inventive concept(s) in any way.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DETAILED DESCRIPTION OF THE EXEMPLARY EMBODIMENTS

Figure 1:
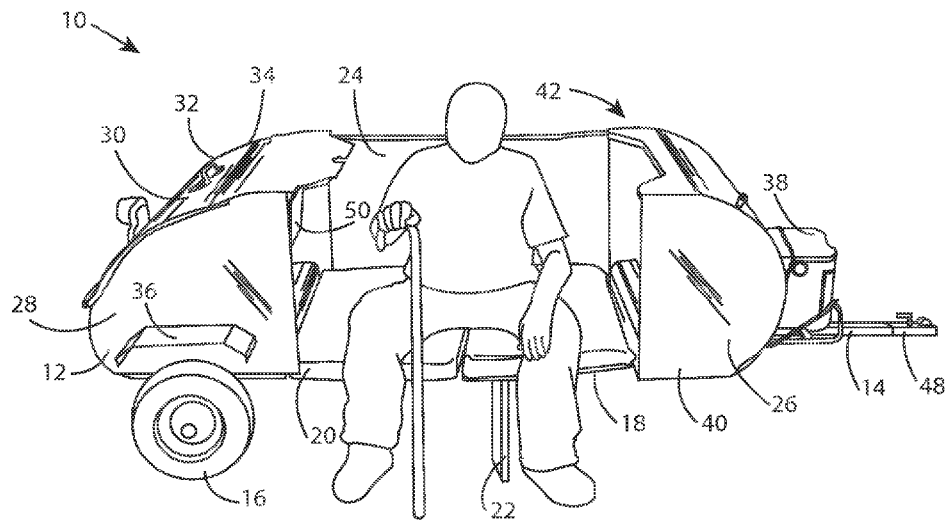
FIG. 1 is a perspective view of a version of the camp trailer.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Preferred Embodiments

Shown in FIGS. 1 through 5 is one preferred embodiment of the fold out camping trailer which is disclosed. FIG. 1 is a perspective view of the fold out camping trailer, and shows the camper body in an extended position which would be utilized when it is used by a camper. The camper body 12 has a forward camper half 26 and a rear camper half 28. The camper has a camper frame 14 which, in this embodiment, is attached to wheel 16. In the extended position of FIG. 1, a folding bed 18 is extended between the forward and the rear camper half providing a sitting or sleeping area for a user. The version shown in FIG. 1 is configured for a single user, but versions for two users are also possible. The camper has a right side 40 and a left side 42. Attached to the underside of the folding bed 18 is a support leg 22. This provides stability and weight support for the bed when it is in use.

The camper body 12 also has a rear hatch 30 which opens to reveal a storage area which could be used for food or lightweight kitchen supplies. The rear hatch 30 has a hatch handle 32 and is attached to camper body 12 at a hinge 34. In the version shown in FIG. 1, an accessory 50 is present which could be a laptop or other flat screen electronic appliance. The folding bed 18 is covered with bed cushions 20 which are foldable along the seams. At the forward end of the frame 14 is a hitch receiver 48 for attachment to a towing ball. Although this fold out camping trailer is specifically designed for towing by a motorcycle, it can also be towed by other small vehicles like four wheelers, compact cars, or even a bicycle.

Figure 2:
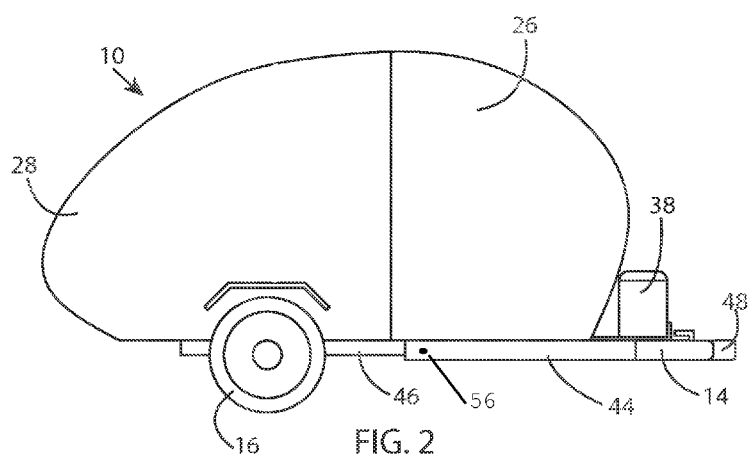
FIG. 2 is a side view of the camp trailer in closed configuration.

FIG. 2 is a side view of the fold out camping trailer of the invention showing the forward camper half 26 and rear camper half 28, this view shows the camper in a retracted position, which would be the preferred configuration for storage or transport. Shown in FIG. 2 is a pin 56 which serves as a closure device for securing the inner frame tube 46 and the outer frame tube 44.

Shown in FIG. 2 are parts of the camper frame 14. One part is an outer frame tube 44, which in one preferred embodiment is approximately 2 inches by 2 inches inner dimensions, with a ¼ inch wall thickness. Inside the outer frame tube 44 is an inner frame tube 46, which is also made of square steel tubing. In this particular embodiment, the inner frame tube would be approximately 1.74 inches by 1.75 inches in outer dimensions, so that it fits inside the outer frame tube 44. Round tubing and tubing of different sizes are also possible. The inner tube 46 is made to telescope into and out of the outer frame tube. The two tubes are secured to each other so that they cannot telescope out while the camper is in transport, by use of a pin which passes through both tubes. The two tubes could be secured to each other by an arrangement such as a locking pin which extends through both tubes and is locked so that it cannot fall out. In this configuration the inner frame tube 46 is attached in a generally T-shaped fashion to the two wheels 16. Obviously, the two wheels could be attached to the camper without the use of an axle extending between the wheels, such as by being attached to the bottom of the camper body.

Although in this preferred embodiment the frame 14 is comprised of a single outer frame tube 44 and a single inner frame tube 46, another preferred embodiment of the frame structure is to have an extending frame element on each side of the camper, and the use of three or more expanding tubes is also possible. Each of these frame configurations fall within the inventive concept which is disclosed.

Figure 3:
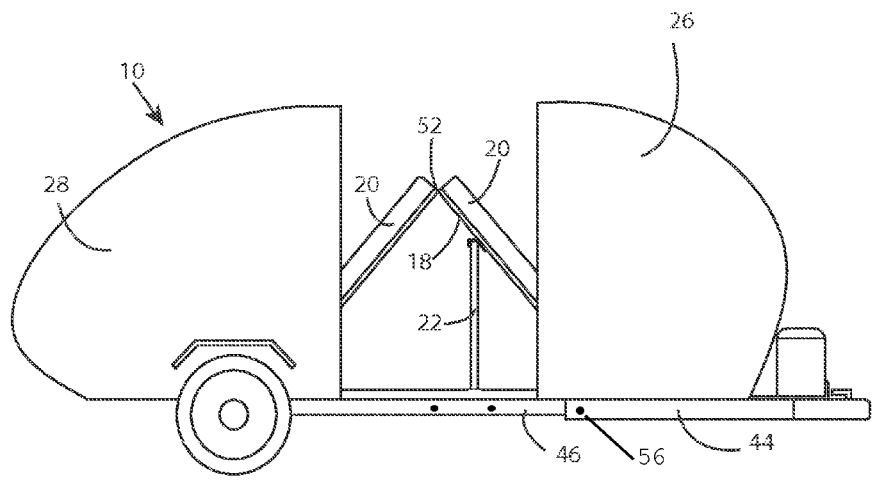
FIG. 3 is a side view of the camp trailer partially open.
Figure 4:
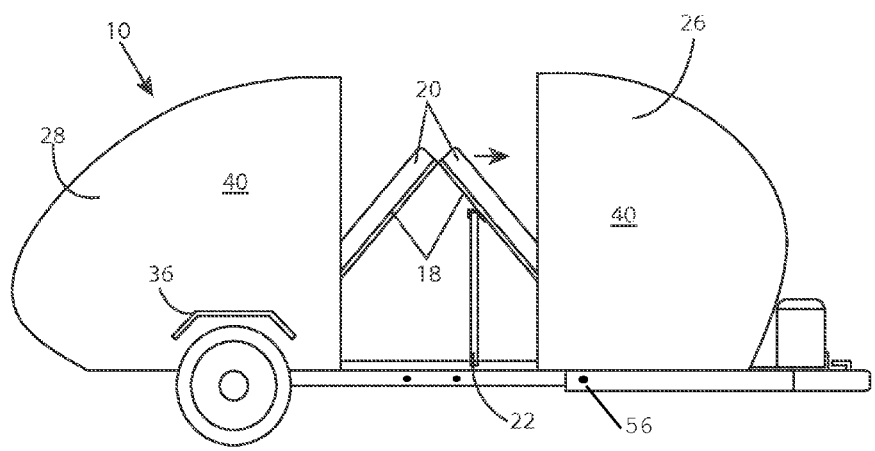
FIG. 4 is a side view of the camp trailer partially open.

FIGS. 3 and 4 show views of the camping trailer 10 in which the forward and rear half of the camper are partially drawn apart. This is accomplished by the inner frame tube 46 extending out from the outer frame tube 44. Shown in FIG. 3 is the folding bed 18 with a bed hinge 52 around which the two sections of folding bed move. Attached to the folding bed are bed cushions 20 and attached to the underside of the bed is a support leg 22. The support leg 22 rises up as the bed is folded so it is not an obstruction as the camper is being towed down the road.

FIG. 4 shows the fold out camper 10 in which the forward camper half 26 and the rear camper half 28 are extended a bit further apart. In this position the support leg 22 is still not touching the ground but is closer to the ground. When the camper is fully extended and the bed 18 is fully extended, the support leg 22 would be touching the ground when on a level surface. Shown in each of these drawings is a fender 36 which is attached to the right side 40 of the camping trailer.

Figure 5:
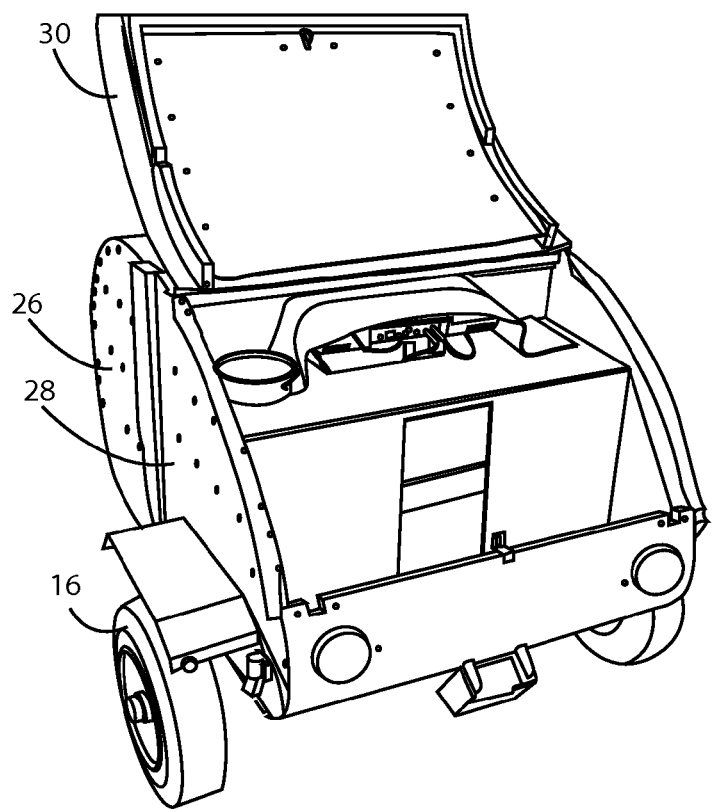
FIG. 5 is a perspective view showing the rear hatch of the trailer open.

FIG. 5 shows the rear of the camper, with the hatch 30 open to access a kitchen or storage area at the rear of the camper.

Figure 6:
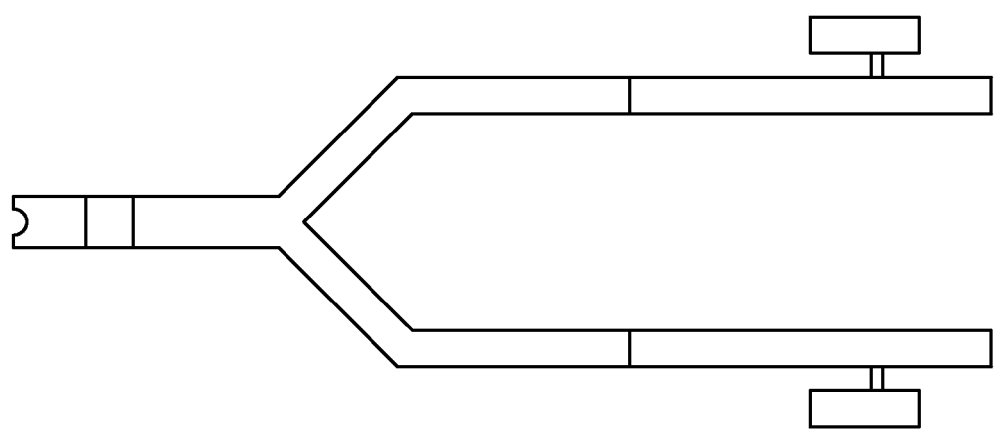
FIG. 6 is a top view of a version of the trailer with two expanding frame members.

FIG. 6 shows a top view of the camper in which two frame members telescope out to expand the camper.

Figure 7:
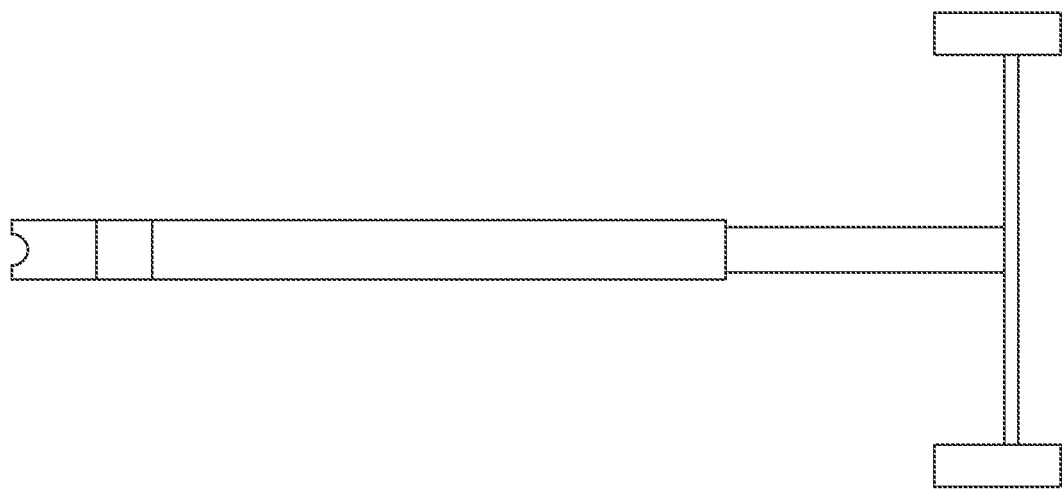
FIG. 7 is a top view of a version of the trailer with a single expanding frame member.

FIG. 7 shows a top view of the camper in which a single frame member telescopes out to expand the camper. Other versions with 3 or more telescoping frame members are also possible.

While certain exemplary embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. A foldout camping trailer for attachment to rear of a vehicle, said camping trailer comprising:
    a trailer frame with a tongue configured for attachment to a said rear of said vehicle and a left and right wheel attached to said trailer frame, with at least one frame member comprised of an outer frame tube and an inner frame tube, with said inner frame tube extendible from said outer frame tubes;
    a trailer body with a forward section and a rear section, with said trailer body sections attached to said frame; and
    a folding trailer floor comprised of a plurality of floor pieces with each floor piece having a left and right edge, and a forward and back edge, until said floor pieces hingedly joined to each other and to trailer body floor edges on said forward and trailer body rear sections, with said trailer body rear section configured to extend out from said forward section of said trailer body with said floor pieces extending to form a flat trailer floor.

2. The camping trailer of claim 1 in which said trailer frame is comprised of a single outer frame tube and a single inner frame tube.

3. The camping trailer of claim 1 which further comprises a fabric tent body attached to an inside perimeter of said forward and rear body sections, with said tent body forming a mid trailer covering when said rear body section is extended.

4. The camping trailer of claim 2 which further comprises a sealable door on a side of said tent body.

5. The camping trailer frame of claim 1 which further comprises one or more floor support legs attached to the floor pieces for support of said floor sections.

6. The camping trailer frame of claim 1 which further comprises two telescoping frame sections attached to said rear body section, with said telescoping frame sections configured to extend when said rear body section is pulled away from said forward section.

7. The camping trailer frame of claim 1 in which said left and right wheels are attached to said rear section.

8. The camping trailer frame of claim 1 which further comprises one of more closure devices which lock said inner frame tube to a corresponding outer frame tube.

9. The camping trailer of claim 1 which further comprises an openable rear hatch cover and a rear storage compartment on said rear body section.

\* \* \* \* \*